UNITED STATES PATENT OFFICE.

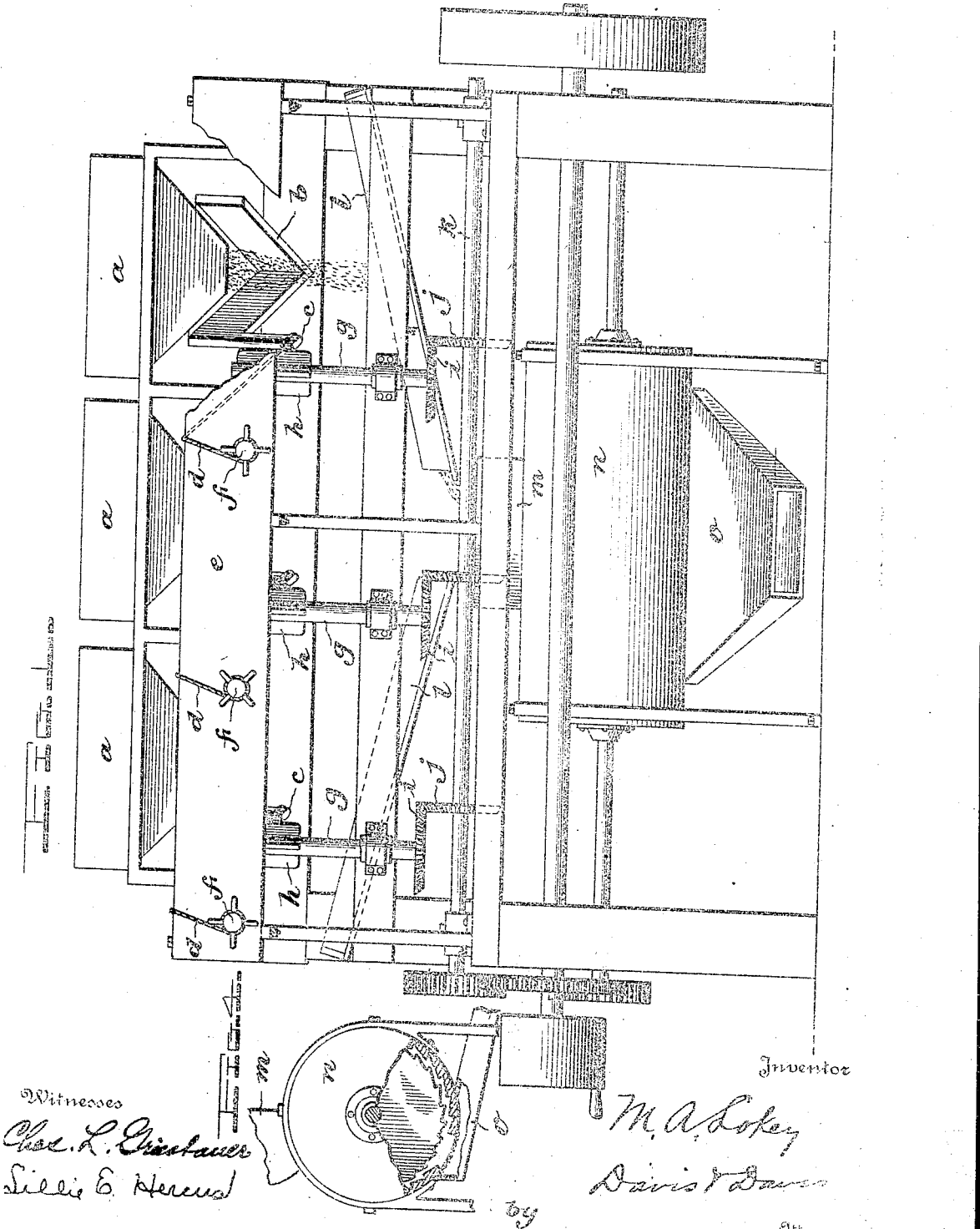

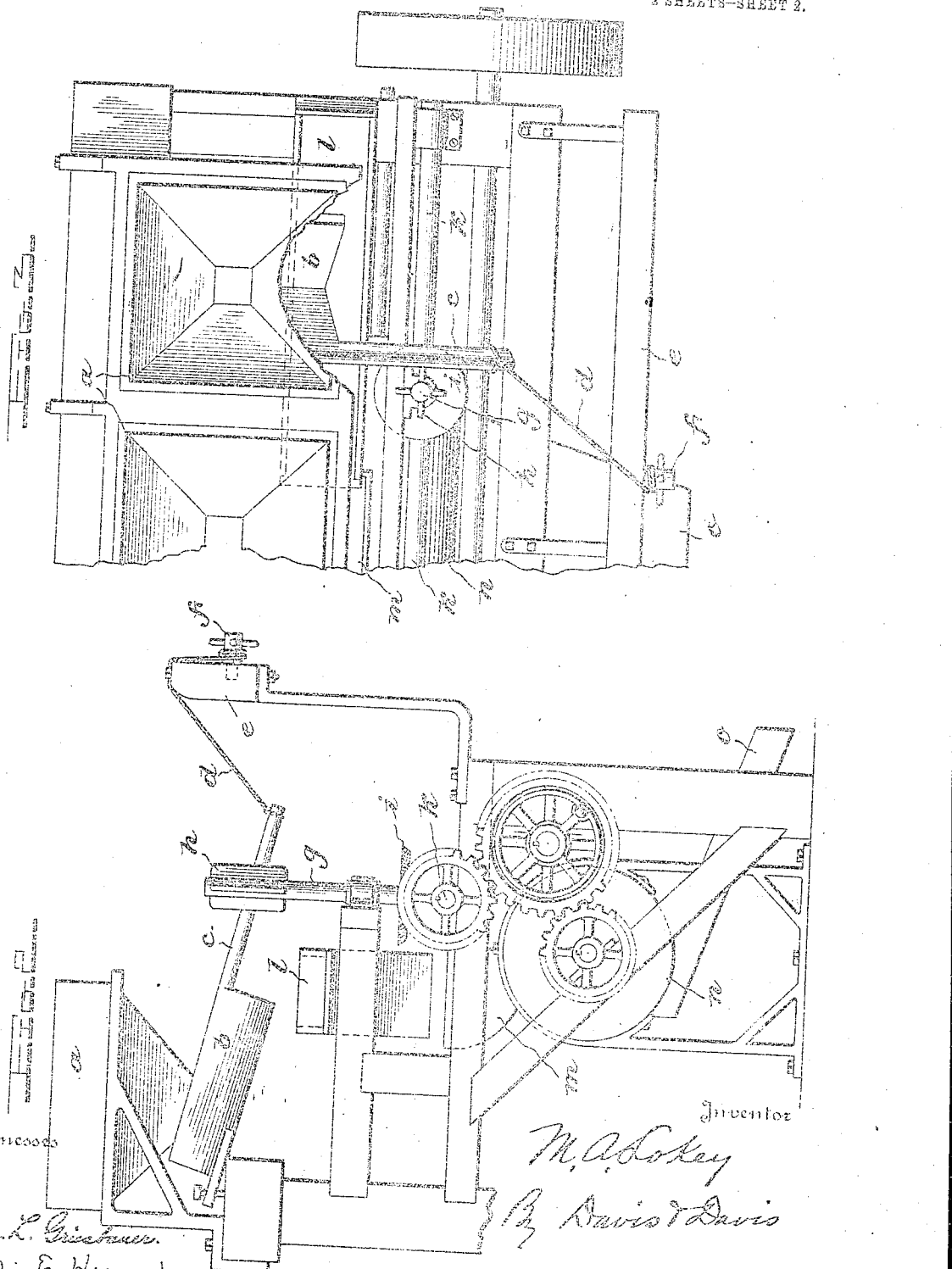

MILTON A. LOKEY, OF HATCHER STATION, GEORGIA.

FERTILIZER-MIXER.

1,100,896.  Specification of Letters Patent.  Patented June 23, 1914.

Application filed December 8, 1913. Serial No. 805,270.

*To all whom it may concern:*

Be it known that I, MILTON A. LOKEY, a citizen of the United States, and a resident of Hatcher Station, county of Quitman, State of Georgia, have invented certain new and useful Improvements in Fertilizer-Mixers, of which the following is a full and clear specification, reference being had to the accompanying drawings, in which—

Figure 1 is a front elevation partly broken away; Fig. 2 is an end elevation; Fig. 3 is a plan view of one end of the machine; and Fig. 4 is a detail view partly in end elevation and partly in vertical section, of the grinder.

This invention has relation to that class of machines adapted for mixing in various proportions the several ingredients of fertilizer compositions, and the object of the present improvement is to simplify the means whereby the proportions of the several ingredients are varied to insure a thorough mixture of the several ingredients, as more fully hereinafter set forth.

In the drawings, $a$ designates a series of three hoppers mounted so as to discharge directly into spouts $b$, each of which is pivotally supported at its rear end upon the frame of the machine and is provided at its forward end with a forwardly projecting arm $c$. Attached to each arm $c$ is a cord or other flexible element $d$ which is carried upwardly and forwardly over a beam $e$, mounted on the frame of the machine, and then downwardly and wound around a drum or shaft $f$ journaled so as to turn in said beam $e$.

Mounted alongside of each of the arms $c$ is an upright shaft $g$ whose upper end is provided with a series of longitudinal wings $h$ which project radially from the shaft. Affixed to the lower end of each shaft $g$ is a gear $i$ and meshing with these gears $i$ is a series of gears $j$ affixed to a horizontal shaft $k$. The shaft $k$ is adapted to be driven by any suitable gearing, to the end that the vertical shafts $g$ shall be simultaneously rotated. It will be observed that each one of the drums $f$ is journaled at a point on the beam $e$ to the left of its corresponding vertical shaft $g$, so that the pull on the flexible element $d$ will normally hold the arm $c$ against the paddles or wings $h$ on said shaft $g$, so that when the shafts $g$ are rotated the wings or paddles will knock against the arms $c$ and thus shake the spouts $b$ sufficiently to discharge from their forward ends the fertilizing materials that are respectively deposited in said spouts from the overhead hoppers. The spouts $b$ are arranged to discharge into troughs $l$, which in turn discharge into a hopper $m$ of a well known type of cylinder grinding machine $n$. After the mixed ingredients are ground, they are discharged in a thoroughly mixed and comminuted state from the spout $o$ of the grinder.

It will be observed that by raising and lowering the spouts $b$ the speed and quantity of discharge therefrom can be varied, whereby the proportions of the ingredients may be readily changed from time to time as occasion may require.

Having thus described my invention, what I claim is:

In a mixer, the combination of a series of hoppers, a spout under each hopper, each spout being pivotally supported at its rear end and provided with a forwardly projecting arm at its front end, an upright shaft alongside of each arm and provided with a series of longitudinal radial wings or paddles, means for rotating these shafts, means for supporting and adjusting the forward ends of the spouts embodying a flexible element attached to the forward ends of the arm and extending upwardly and laterally therefrom, the lateral inclination of the flexible element serving to hold the arm against the wings or paddles, means for lengthening and shortening the flexible element to thereby vary the inclination of the spout, and means for mixing the several ingredients discharged from the spouts.

In testimony whereof I hereunto affix my signature in the presence of two witnesses.

MILTON A. LOKEY.

Witnesses:
W. W. BLEDSOE,
L. G. BRAMNON.